— United States Patent [19] — Hagen

[11] 3,882,122
[45] May 6, 1975

[54] THIENOPYRAZINE DIOXIDES AND METHODS OF MAKING SAME
[75] Inventor: Edward L. Hagen, Woodbury, Conn.
[73] Assignee: Uniroyal, Inc., New York, N.Y.
[22] Filed: Feb. 28, 1973
[21] Appl. No.: 336,752

[52] U.S. Cl. ... 260/268 TR; 260/77.5 A; 260/78 R; 260/79.3 M; 260/250 Q; 260/268 FT; 424/250
[51] Int. Cl............................................ C07d 51/66
[58] Field of Search ...... 260/268 FT, 250 B, 250 Q, 260/268 TR

[56] References Cited
UNITED STATES PATENTS
3,306,912  2/1967  Fritz et al. .................... 260/332.1

Primary Examiner—Donald G. Daus
Assistant Examiner—Jose Tovar
Attorney, Agent, or Firm—Robert J. Patterson, Esq.

[57] ABSTRACT

Disclosed are new octahydrothieno[3,4-b]pyrazine 6,6-dioxides, which are useful as monomers and intermediates, reaction thereof with diacid dichlorides to form polyamides, reaction thereof with divinylsulfone to make novel polymers, and methods of making the new octahydrothieno[3,4-b]pyrazine 6,6-dioxides.

10 Claims, No Drawings

THIENOPYRAZINE DIOXIDES AND METHODS OF MAKING SAME

CROSS-REFERENCE TO RELATED APPLICATION

Copending application Ser. No. 336,590 filed of even date herewith in the names of Nudenberg, Hagen, Little and Mao, is directed to the use of the new octahydrothieno[3,4-b]pyrazine 6,6-dioxides of the present invention in the manufacture of certain monoalkanols and dialkanols of octahydrothieno[3,4-b]pyrazine 6,6-dioxides and use of the latter as chain-extenders in the preparation of polyurethanes.

BACKGROUND OF THE INVENTION

1. Field of the Invention

The field of the invention is new octahydrothieno[3,4-b]pyrazine 6,6-dioxides useful as monomers and intermediates, methods of making these new compounds, and certain uses thereof.

2. Description of the Prior Art

The known prior art consists of:

Coll. Czech. Chem. Communs., 24, 2278 (1959), (Chemical Abstracts 54, 483b) which describes the preparation of 3,4-diaminotetrahydrothiophene 1,1-dioxide, IV below.

Bailey and Cummins, J. Am. Chem. Soc., 76, 1932 (1954) which describes the preparation of 3,4-diaminotetrahydrothiophene 1,1-dioxide, V below.

Argyle et al., J. Chem. Soc. C, 2156 (1967) describes the preparation of 3,4-dihydrazinotetrahydrothiophene 1,1-dioxide, VI below.

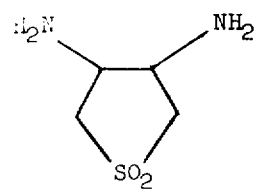

IV

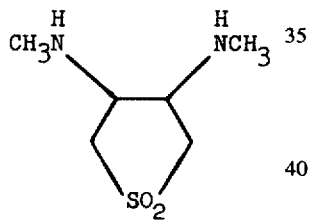

V

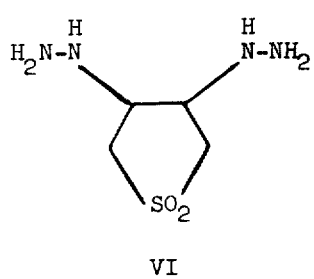

VI

Fritz et al., U.S. Pat. No. 3,306,912, granted Feb. 28, 1967, describes sulfolanylpolyamines and their production by reacting a 3,4-diahalotetrahydrothiophene 1,1-dioxide with an alkylene polyamine in a basic medium.

The new dioxides of this invention differ from prior art compounds in that they are all bicyclic or tricyclic monomers. The prior art compounds are not bicyclic except when incorporated into a polyamine structure, as in U.S. Pat. No. 3,306,912, where they are no longer functional or monomeric.

SUMMARY OF THE INVENTION AND DESCRIPTION OF THE PREFERRED EMBODIMENTS

The present invention, in one aspect, relates to a new class of chemical compounds having the general formulae:

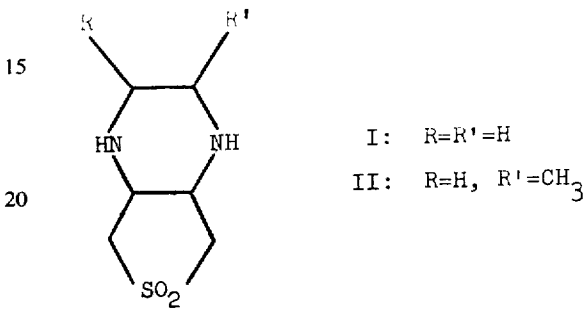

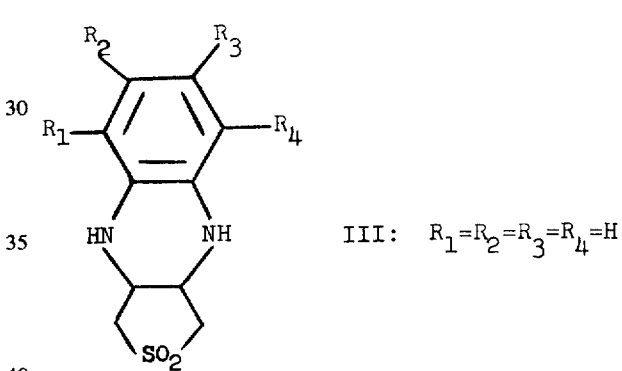

wherein R is hydrogen, R' may be hydrogen or an alkyl group having 1 to 10 carbon atoms, and the aromatic ring may bear up to four substituent groups $R_1$, $R_2$, $R_3$ and $R_4$ which may be the same or different from each other and which are selected from the group consisting of hydrogen, alkyl such as alkyl groups having from 1 to 10 carbon atoms, aryl such as phenyl, aralkyl such as benzyl, alkaryl, and halogen (chlorine, bromine, fluorine or iodine).

The new compounds, I, II and III, are prepared in one step from a known material, 3,4-dihalotetrahydrothiophene 1,1-dioxide. The halogen in this reactant is almost invariably chlorine or bromine. Reaction of this dihalide with ethylene diamine, propylene diamine or o-phenylene diamine yields I, II or III respectively. These thienopyrazine dioxides react as monomers with diacid chlorides or activated diolefins to yield polymers. They are also useful as intermediates which react with epoxides to produce the dialkanols of thienopyrazine dioxides of the copending application referred to above.

The new compositions of this invention are all prepared in one step starting with the known chemical, 3,-

4-dichlorotetrahydrothiophene 1,1-dioxide,[1,2] VII, or 3,4-dibromotetrahydrothiophene 1,1-dioxide,[3] VIII.

[1] M. Prochazka and V. Horak, Chem. listy, 52, 1768 (1958); CA, 53, 5228i.
[2] T. E. Jordan and F. Kipnis, J. Am. Chem. Soc., 71, 1875 (1949).
[3] W. J. Bailey and E. W. Cummins, J. Am. Chem. Soc., 76, 1932 (1954).

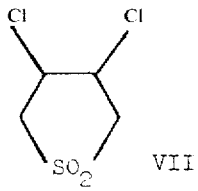

VII or $\xrightarrow{\text{Diamine}}$ I, II, or III + diamine salt

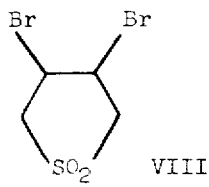

VIII

| Diamine | Product |
|---|---|
| Ethylene diamine | 1,2,3,4,4a,5,7,7a-octahydro-thieno[3,4-b]pyrazine 6,6-dioxide (I) |
| Propylene diamine | 1,2,3,4,4a,5,7,7a-octahydro-2-methylthieno[3,4-b]pyrazine 6,6-dioxide (II) |
| o-Phenylene diamine | 1,3,3a,4,9,9a-hexahydro-thieno[3,4-b]quinoxaline 2,2-dioxide (III) |

Excess diamine is preferably dissolved in a polar, non-reactive solvent. VII or VIII is dissolved in the same solvent and added to the diamine solution at such a rate as to control the exotherm. After reaction is complete, the by-product salt is separated and the solvent evaporated to leave crude product. At least three moles of diamine should be used for each mole of dihalide. Excess diamine over the 3:1 ratio required is not harmful at least up to a 6:1 ratio. Dioxane is the preferred solvent although any solvent or solvent mixture which dissolves VII, VIII and the diamine and is not reactive as a nucleophile will work. Acetone is another example of a suitable solvent. It is also advantageous if the by-product diamine salt is insoluble in the solvent. Reaction temperature is not critical as long as the exotherm is controlled. Temperatures from 0° to 90°C. can be used; reaction temperatures of 50°–70°C. are preferred. The reaction can be carried out without solvent, using only excess diamine, but this makes work-up to recover the desired product more difficult.

The thienopyrazine dioxides of this invention are reactive as monomers. In a basic solvent they react with an equivalent of a diacid dichloride to form polyamides. Dimethylacetamide is the preferred solvent; it scavenges the acid formed in the reaction. The polymerization reaction is exothermic. When the solution cools to room temperature, the acid salt of the solvent crystallizes out of solution. The polymer is flocced into water, washed and dried. Reaction temperature is not critical. Diacid dichlorides can have 6 to 10 carbons. When there are fewer than six carbons in the diacid dichloride, the polyamide is isoluble and only low molecular weight is achieved. The thienopyrazine dioxides also react as monomers with activated diolefins. A polymer results when they are placed in a non-reactive solvent with divinylsulfone and let stand for several days. Dimethyl sulfoxide is the preferred solvent.

The thienopyrazine dioxides of this invention are also useful as intermediates. Certain of them react with epoxides to give dialkanols of thienopyrazine dioxides which are useful as chain-extenders for polyurethanes. The details of these reactions and the usefulness as chain-extenders is the subject of the copending application of Nudenberg, Hagen, Little and Mao referred to above.

EXAMPLE 1

The following example describes the preparation of thienopyrazine dioxide, I, 1,2,3,4,4a,5,7,7a-octahydro-thieno[3,4-b]pyrazine 6,6-dioxide from 3,4-dichlorotetrahydrothiophene 1,1-dioxide, VII, and gives evidence of its structure.

Ethylene diamine (1330 ml., 20 moles) was dissolved in 1,500 ml. dioxane in a 500 ml. flask and stirred. 3,4-Dichlorotetrahydrothiophene 1,1-dioxide (VII, 567 g., 3 moles) was dissolved in 2,000 ml. dioxane and added gradually over 3 hours to the ethylene diamine solution at 0°C. When the addition was complete, the solution was heated over steam for 2½ hours, then allowed to stir overnight at ambient temperature. The mixture separated into two layers. The top dioxane layer was decanted, the bottom layer containing ethylene diamine and amine salt was washed twice with 1,000 ml. dioxane, and all the dioxane portions were combined. The dioxane was stripped off to leave crude diamine, I. After three recrystallizations from toluene, 203 g. of I was obtained (40%). I formed white solid plates, m.p. 112.5°–114°C., showed IR bands at 3,340 and 3,310 cm$^{-1}$ (NH) and at 1,290 and 1,100 cm$^{-1}$ (SO$_2$), gave 3 complex n.m.r. bands in D$_2$O with relative areas of 2:2:1 consistent with I, and analyzed: C(41.22, 41.18), H(6.84, 7.01), N(15.69, 15.52) and S(18.41, 18.21); Calculated for C$_6$H$_{12}$N$_2$O$_2$S: C(40.8), H(6.82), N(15.9) and S(18.2).

EXAMPLE 2

This example demonstrates that the thienopyrazine dioxide, I, of Example 1 can be prepared from 3,4-dibromotetrahydrothiophene 1,1-dioxide, VIII.

Example 1 was followed except that 3,4-dibromotetrahydrothiophene 1,1-dioxide (834 g., 3 mole, VIII) was used in place of VII. The white plate obtained had m.p. 112°–114° and IR and n.m.r. spectra identical to the product of Example 1.

EXAMPLE 3

The following example describes the preparation of thienopyrazine dioxide, II, 1,2,3,4,4a,5,7,7a-octahydro-2-methylthieno[3,4-b]pyrazine 6,6-dioxide, and provides evidence of its structure.

Example 1 was followed except that propylene diamine (1,500 g., 20 moles) was used in place of ethylene diamine. Recrystallization of the crude product from toluene gave a white solid, m.p. 152°–56°C. The IR showed NH (3,300 cm$^{-1}$) and SO$_2$ (1,290 and 1,115 cm$^{-1}$). N.m.r. supports II with 1.00 methyl doublet at 1.00 ppm and a ratio of nonmethyl to methyl hydrogens of 3.60:1 (calculated 3.67:1). Calculated for C$_7$H$_{14}$N$_2$O$_2$S: C(44.2), H(7.37), N(14.7) and S(16.8); found C(44.30, 44.03), H(7.32, 7.38), N(14.75, 14.77) and S(16.79, 16.51).

EXAMPLE 4

This example describes the preparation of the thienopyrazine dioxide, III, 1,3,3a,4,9,9a-hexahydrothieno[3,4-b]quinoxaline 2,2-dioxide and provides evidence of its structure.

162 g. o-Phenylenediamine (1.5 mole) was dissolved in 1000 ml. dioxane in a 2,000 ml. flask equipped with mechanical stirrer, reflux condenser and addition funnel. 139 g. VIII (0.5 mole) was dissolved in dioxane and added over one hour. After the addition was complete the mixture was heated on a steam bath (about 90°C.) overnight. The mixture was allowed to cool and filtered to remove the amine salt biproduct. The dioxane was removed under reduced pressure to leave a black solid. Several recrystallizations from acetonitrile give a nearly white solid, m.p. 210°–212°C. (dec.). IR showed bands at 3,400 and 3,340 cm$^{-1}$ (NH), 1,600, 1,510, 1,470 and 740 cm$^{-1}$ (phenyl), and at 1,300 and 1,130 cm$^{-1}$ (SO$_2$). N.m.r. supports III with aromatic hydrogens at 6.45 ppm (singlet), hydrogens $\beta$ to sulfone at 4.04 ppm and those $\alpha$ to sulfone at 3.18 ppm. The $\alpha$-hydrogens are different and form the AB part of an ABX system with the $\beta$-hydrogen being the X part. Calculated for C$_{10}$H$_{12}$N$_2$O$_2$S: C(53.5), H(5.35), N(12.5) and S(14.3); found C(53.84, 53.74), H(5.34, 5.40), N(12.27, 11.85) and S(13.88, 14.04).

EXAMPLE 5

The following example describes the preparation of a polyamide from thienopyrazine dioxide, I, and adipoyl dichloride. 1,2,3,4,4a,5,7,7a-Octahydrothieno[3,4-b]pyrazine 6,6-dioxide, I, (3.52 g., 0.0200 mole) was dried under vacuum and then dissolved in 30 ml. dimethylacetamide that had been distilled from P$_2$O$_5$ and stored over molecular sieves. This solution was magnetically stirred. To it was added at once, freshly distilled adipoyl dichloride (3.66 g., 0.0200 mole), the final amount being rinsed in with a small amount of solvent. The exotherm was not controlled on this scale, but would have to be on larger scale. The solution cooled to room temperature gradually and was allowed to stir overnight. Dimethylacetamide hydrochloride crystallized out of solution. This mixture was flocced into water to isolate the polymer, poly(1,2,3,4,4a,5,7,7a-octahydro-6,6-dioxothieno[3,4-b]-pyrazine-1,4-diyladipoyl). After drying, it had an intrinsic viscosity in formic acid of 0.33, T$_g$ of 88°C by differential thermal analysis (DTA) and no X-ray crystallinity.

EXAMPLE 6

The following example describes the preparation of a polymer from thienopyrazine dioxide, I, and divinyl sulfone.

Divinyl sulfone (5.62 g., 0.0477 mole) was placed into a 50 ml. flask. 1,2,3,4,4a,5,7,7a-Octahydrothieno[3,4-b]pyrazine 6,6-dioxide, I, (8.39 g., 0.0477 mole) was dissolved in 25 ml. dimethyl sulfoxide and added to the divinyl sulfone. The mixture was stirred; no exotherm occurred. After standing two weeks a solid bottom layer formed. It was dissolved in dimethyl formamide and flocced into water. After drying the polymer, poly(1,2,3,4,4a,5,7,7a-octahydro-6,6-dioxothieno[3,4-b]pyrazine-1,4-diylethylenesulfonylethylene), had an intrinsic viscosity of 0.26 in formic acid, T$_g$ of 145°C. by DTA and no X-ray crystallinity. Calculated for (C$_{10}$H$_{18}$N$_2$O$_4$S)$_n$: C(40.8), H(6.12), N(9.52) and S(21.7); found C(39.89, 39.79), H(6.18, 6.16), N(9.14, 9.11) and S(21.28, 21.33).

EXAMPLE 7

Use of thienopyrazine dioxides as intermediates for dialkanols of thienopyrazine dioxide is described in detail in the aforementioned copending application. This example illustrates such use.

2.5 ml. (0.05 mole) of ethylene oxide was condensed into a reaction flask and dissolved in 5 ml. of water. To this solution was added gradually at room temperature, a solution of 3.5 g. (0.02 mole) in 5 ml. of water of 1,2,-3,4,4a,5,7,7a-octahydrothieno[3,4-b]pyrazine 6,6-dioxide, I. After the reaction was complete, the reaction mixture was allowed to cool to room temperature and the water and excess epoxide were removed under vacuum, leaving a white solid. Trituration with toluene gave a product, 1,2,3,4,4a,5-7,7a-octahydrothieno[3,4-b]pyrazine-1,4-diethanol 6,6-dioxide, m.p. 145°–147°C. IR spectrum showed bands at 3300 cm$^{-1}$, broad (OH) at 1285 cm$^{-1}$ and 1125 cm$^{-1}$ (SO$_2$) and at 1,010 cm$^{-1}$ (CO). Calculated for C$_{10}$H$_{20}$N$_2$O$_4$S (percent): C(45.41), H(7.58), N(10.6), S(12.1); found (percent): C(45.34, H(7.35 ), N(10.45), S(11.8).

From the foregoing it will be seen that the present invention provides a novel class of chemical compounds, namely octahydrothieno[3,4-b]pyrazine 6,6-dioxides, novel, convenient and advantageous methods of making such compounds, and novel uses thereof including reaction with diacid dichlorides to produce polyamides and reaction with divinylsulfone to produce polymers. Other advantages of the various embodiments of the invention will be apparent to those skilled in the art.

I claim:

1. A compound selected from the group consisting of compounds having the formula:

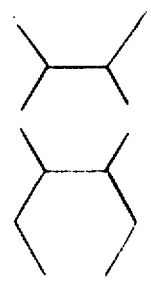

wherein R is hydrogen and R' is hydrogen or methyl, and a compound having the formula:

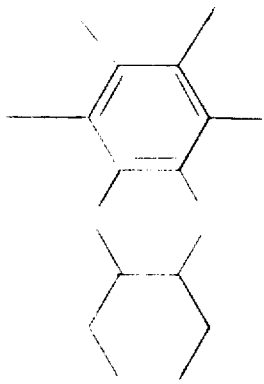

wherein $R_1$, $R_2$, $R_3$ and $R_4$ are hydrogen.

2. As a chemical compound, 1,2,3,4,4a,5-7,7a-octahydrothieno[3,4-b]pyrazine 6,6-dioxide.

3. As a chemical compound, 1,2,3,4,4a,5-7,7a-octahydro-2-methylthieno[3,4-b]pyrazine 6,6-dioxide.

4. As a chemical compound, 1,3,3a,4,9,9a-hexahydrothieno[3,4-b]quinoxaline 2,2-dioxide.

5. A compound having the formula:

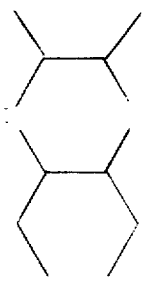

wherein R is hydrogen and R' is hydrogen or methyl.

6. The method of making a compound selected from the group consisting of compounds having the formula:

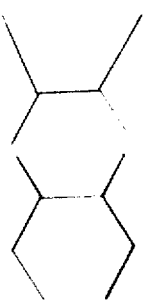

wherein R is hydrogen and R' is hydrogen or methyl, and a compound having the formula:

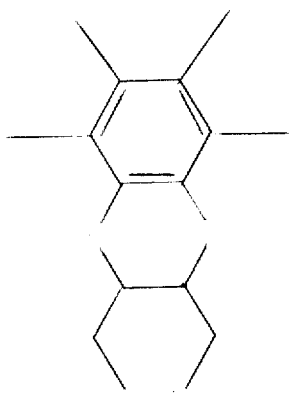

wherein $R_1$, $R_2$, $R_3$ and $R_4$ are hydrogen, which consists of reacting a 3,4-dihalotetrahydrothiophene 1,1-dioxide with a diamine selected from the group consisting of (1) alkylene diamines having the formula:

wherein R' is hydrogen or methyl and (2) o-phenylene diamine, in a non-reactive solvent in which the reactants are soluble but in which the by-product diamine salt formed in the reaction is insoluble, at a temperature of from 0° to 90°C., and recovering a compound selected from the first-mentioned group from the reaction mixture as a product of the reaction.

7. The method of making a compound having the formula:

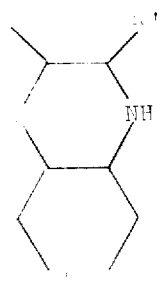

wherein R is hydrogen and R' is hydrogen or methyl, which consists of reacting a 3,4-dihalotetrahydrothiophene 1,1-dioxide with an alkylene diamine having the formula:

wherein R' is hydrogen or methyl, in a non-reactive solvent in which the reactants are soluble but in which the by-product diamine salt formed in the reaction is insoluble, at a temperature of from 0° to 90°C., and recovering a compound having the first-mentioned formula from the reaction mixture as a product of the reaction.

8. The method of making 1,2,3,4,4a,5,7,7a-octahydrothieno[3,4-b]pyrazine 6,6-dioxide which consists of reacting a 3,4-dihalotetrahydrothiophene 1,1-dioxide with ethylene diamine in a non-reactive solvent in which the reactants are soluble but in which the by-product diamine salt formed in the reaction is insoluble, at a temperature of from 0° to 90°C., and recovering 1,2,3,4,4a,5,7,7a-octahydrothieno[3,4-b]pyrazine 6,6-dioxide from the reaction mixture as a product of the reaction.

9. The method of making 1,2,3,4,4a,5,7,7a-octahydro-2-methylthieno[3,4-b]pyrazine 6,6-dioxide which consists of reacting a 3,4-dihalotetrahydrothiophene 1,1-dioxide with propylene diamine in a non-reactive solvent in which the reactants are soluble but in which the by-product diamine salt formed in the reaction is insoluble, at a temperature of from 0° to 90°C., and recovering 1,2,3,4,4a,5,7,7a-octahydro-2-methylthieno[3,4-b]pyrazine 6,6-dioxide from the reaction mixture as a product of the reaction.

10. The method of making 1,3,3a,4,9,9a-hexahydrothieno[3,4-b]quinoxaline 2,2-dioxide which consists of reacting a 3-4-dihalotetrahydrothiophene 1,1-dioxide with o-phenylene diamine in a non-reactive solvent in which the reactants are soluble but in which the by-product diamine salt formed in the reaction is insoluble, at a temperature of from 0° to 90°C., and recovering 1,3,3a,4,9,9a-hexahydrothieno[3,4-b]quinoxaline 2,2-dioxide from the reaction mixture as a product of the reaction.

* * * * *